(12) United States Patent
Wakizaka et al.

(10) Patent No.: US 8,560,260 B2
(45) Date of Patent: Oct. 15, 2013

(54) ROTATION ANGLE POSITIONING DEVICE

(75) Inventors: Munetaka Wakizaka, Iga (JP); Hideaki Hiramitsu, Kasugai (JP)

(73) Assignees: Mori Seiki Co., Ltd., Yamatokoriyama-Shi (JP); Mitsubushi Electric Corporation, Tokyo (JP)

( * ) Notice: Subject to any disclaimer, the term of this patent is extended or adjusted under 35 U.S.C. 154(b) by 323 days.

(21) Appl. No.: 13/115,936

(22) Filed: May 25, 2011

(65) Prior Publication Data
US 2011/0320154 A1 Dec. 29, 2011

(30) Foreign Application Priority Data
Jan. 8, 2010 (JP) .................................. 2010-003258

(51) Int. Cl.
*G01C 17/38* (2006.01)
*G06F 19/00* (2011.01)

(52) U.S. Cl.
USPC ............. 702/94; 702/104; 702/105; 702/183; 702/186

(58) Field of Classification Search
USPC .................... 702/94, 104, 105, 182–186, 189
See application file for complete search history.

(56) References Cited

U.S. PATENT DOCUMENTS

| | | | |
|---|---|---|---|
| 7,294,988 B2 * | 11/2007 | Ajima et al. ................... | 318/712 |
| 2003/0074799 A1 * | 4/2003 | Nakano et al. ................... | 33/1 N |
| 2008/0073995 A1 * | 3/2008 | Niguchi et al. ............... | 310/216 |

* cited by examiner

*Primary Examiner* — Phuong Huynh
(74) *Attorney, Agent, or Firm* — Smith Patent Office

(57) ABSTRACT

In a rotation angle positioning device 6 including: a rotation angle detection device 7 which has a detection target ring 8 and an angle detection sensor 9; and a rotating-shaft driving device 10 rotating a rotating shaft so as to cause a rotation angle to become a given command value α for rotation angle, there are provided: an error pattern storage unit 11a storing a tooth-to-tooth period error pattern F made up of errors between detected rotation angles by the angle detection sensor 9 and actual rotation angles, corresponding to respective correction dividing points of an arbitrary tooth-to-tooth period in the detection target ring 8; and a command value correction unit 11b correcting the command value α for rotation angle based on the tooth-to-tooth period error pattern F to find a corrected command value α2 for rotation angle.

3 Claims, 13 Drawing Sheets

FIG. 10

| ERROR CORRECTION TABLE ||
| --- | --- |
| CORRECTION DIVIDING POINT | CORRECTION VALUE |
| 0 | : |
| 1 | : |
| 2 | : |
| 3 | −0.003deg |
| 4 | 0.005deg |
| 5 | : |
| ⋮ | ⋮ |
| 11 | : |

FIG.11

ROTATION PERIOD ERROR CORRECTION TABLE

| INTERVAL [deg] BETWEEN ROTATION PERIOD ERROR CORRECTION POINTS | 5.000 |
|---|---|
| | |
| CORRECTION DIVIDING POINT | CORRECTION AMOUNT [deg] |
| 0 | 0.000 |
| 1 | 0.001 |
| 2 | 0.001 |
| . . . | . . . |
| 5 | 0.003 |
| 6 | 0.005 |
| . . . | . . . |
| | -0.002 |
| 72 | 0 |

FIG.13

TOOTH-TO-TOOTH PERIOD ERROR CORRECTION TABLE

| NUMBER OF TEETH OF DETECTION TARGET RING | 512 |
|---|---|
| NUMBER OF CORRECTION DIVIDING POINT | 16 |
|  |  |
| CORRECTION DIVIDING POINT | CORRECTION AMOUNT [deg] |
| 0 | 0.000 |
| 1 | 0.001 |
| 2 | 0.001 |
| . . . | . . . |
| 6 | -0.001 |
| 7 | -0.004 |
| . . . | . . . |
|  | -0.002 |
| 15 | 0 |

ROTATION ANGLE POSITIONING DEVICE

BACKGROUND OF THE INVENTION

1. Field of the Invention

The present invention relates to a rotation angle positioning device that positions a rotating shaft of, for example, a machine tool at a predetermined angular position, more particularly, to an improvement in a method of correcting an error of a rotation angle detection sensor.

2. Description of the Related Art

Rotation angle positioning devices positioning a rotating shaft of a machine tool, for example, a lathe's spindle to which a chuck is loaded, at a predetermined angular position include one that is provided with a rotation angle detection device detecting a rotation angle of the spindle and a driving device rotationally driving the spindle so that the rotation angle of the spindle detected by the rotation angle detection device becomes a command value for rotation angle.

As the aforesaid conventional rotation angle detection device for the spindle, Japanese Patent Application Laid-open No. Hei 05-288573, for instance, proposes one that uses a detection target ring attached to the spindle and having a plurality of teeth formed at a predetermined pitch and an angle detection sensor fixedly disposed at a position facing the teeth of the detection target ring and outputting a voltage signal according to its distance to the teeth of the detection target ring.

SUMMARY OF THE INVENTION

The aforesaid conventional rotation angle detection device, however, has a problem that between the actual rotation angle of the spindle and the detection value by the angle detection sensor, a rotation period error in one rotation of the detection ring ascribable to the deviation of the center of the detection target ring or the like occurs, and in addition, a tooth-to-tooth period error ascribable to machining accuracy of the teeth of the detection target ring or the like occurs in each tooth-to-tooth period.

As for the correction of the rotation period error, it is possible to realize the correction by previously finding detection errors of the angle detection sensor at correction dividing points dividing a rotation period (360°) of the detection target ring into a plurality of segments and by correcting a command value for rotation angle based on the errors.

As for the correction of the tooth-to-tooth period error, there arises a problem that currently available rotation angle positioning devices cannot cope with the correction because the number of decimal places of an interval (deg) between the correction dividing points in a tooth-to-tooth period is too large. Concretely, for example, if the number of teeth is 512 and the number of correction division is 16, the interval (deg) between the correction dividing points=360°÷the number of teeth÷the number of correction division=0.0439453125 deg.

If the aforesaid method of correcting the rotation period error is adopted as it is for the correction of the tooth-to-tooth period error in the case where the number of teeth is 512 and the number of correction division is 16, the number of correction points=the number of teeth×the number of correction division=8,192, and there arises a problem that too large a number of the correction points hinders the processing.

It is an object of the present invention to provide a rotation angle positioning device that can realize the correction of a tooth-to-tooth period error with a minimum number of correction points.

The present invention is a rotation angle positioning device including: a rotation angle detection device which has a detection target ring provided on a rotating shaft and having a plurality of teeth formed at a predetermined pitch and an angle detection sensor disposed to face the teeth and generating an output according to a distance to the teeth and which finds a rotation angle of the detection target ring based on the output from the angle detection sensor; and a rotating-shaft driving device rotating the rotating shaft so as to cause the rotation angle to become a given command value for rotation angle, the rotation angle positioning device including: an error pattern storage unit storing a tooth-to-tooth period error pattern made up of errors between detected rotation angles by the angle detection sensor and actual rotation angles, corresponding to respective correction dividing points of an arbitrary tooth-to-tooth period in the detection target ring; and a command value correction unit correcting the command value for rotation angle based on the tooth-to-tooth period error pattern to find a corrected command value for rotation angle.

The present inventor has found out that a tooth-to-tooth period error pattern which is made up of errors between detected rotation angles and actual rotation angles at points between two arbitrary adjacent teeth of the detection target ring presents substantially the same tendency in all the tooth-to-tooth periods and has completed the present invention based on this finding.

Specifically, in the present invention, in order to correct the command value for rotation angle, a tooth-to-tooth period error pattern in an arbitrary tooth-to-tooth period is used for all the tooth-to-tooth periods, and the rotating shaft is rotationally driven so that the rotation angle detected by the rotation angle detection device becomes the corrected command value for rotation angle obtained after the correction, whereby an error of the angle detection sensor can be absorbed.

As described above, since it is possible to make the correction by using only the tooth-to-tooth period error pattern made up of detection errors of the angle detection sensor at correction dividing points between two arbitrary adjacent teeth, the number of the error correction points can be greatly reduced and only a small memory capacity is required.

In a preferable embodiment of the present invention, the error pattern storage unit stores the tooth-to-tooth period error pattern and a rotation period error pattern made up of errors between detected rotation angles by the angle detection sensor and actual rotation angles when the detection target ring is rotated once, and the command value correction unit corrects the command value for rotation angle based on the rotation period error pattern and the tooth-to-tooth period error pattern to find the corrected command value for rotation angle.

According to the preferable embodiment, since the command value for rotation angle is corrected based on the tooth-to-tooth period error pattern and the rotation period error pattern, it is possible to correct an error ascribable to the deviation of the center of the detection target ring or the like and an error ascribable to machining accuracy of the teeth of the detection target ring or the like.

In another preferable embodiment of the present invention, the command value correction unit corrects the command value for rotation angle based on the rotation period error pattern to find a first corrected command value for rotation angle, and corrects the first corrected command value for rotation angle based on the tooth-to-tooth period error pattern to find a second corrected command value for rotation angle.

According to the other preferable embodiment, the command value for rotation angle is corrected based on the rotation period error pattern, whereby the first corrected command value for rotation angle is found, and the first corrected command value for rotation angle is corrected based on the tooth-to-tooth period error pattern, whereby the second corrected command value for rotation angle is found, and therefore, the correction of an error ascribable to the deviation of the center of the detection target ring or the like is followed by the correction of an error ascribable to machining accuracy of the teeth of the detection target ring or the like, which makes it possible to more efficiently and surely correct the both errors.

BRIEF DESCRIPTION OF THE DRAWINGS

FIG. 10 is a chart showing a tooth-to-tooth period error correction table adopted in the flowchart;

FIG. 11 is a chart showing a rotation period error correction table of a rotation angle positioning device according to an embodiment 2 of the present invention;

FIG. 13 is a chart showing a tooth-to-tooth period error correction table of the rotation angle positioning device according to the embodiment 2 of the present invention.

DETAILED DESCRIPTION OF THE PREFERRED EMBODIMENTS

Figure 1:
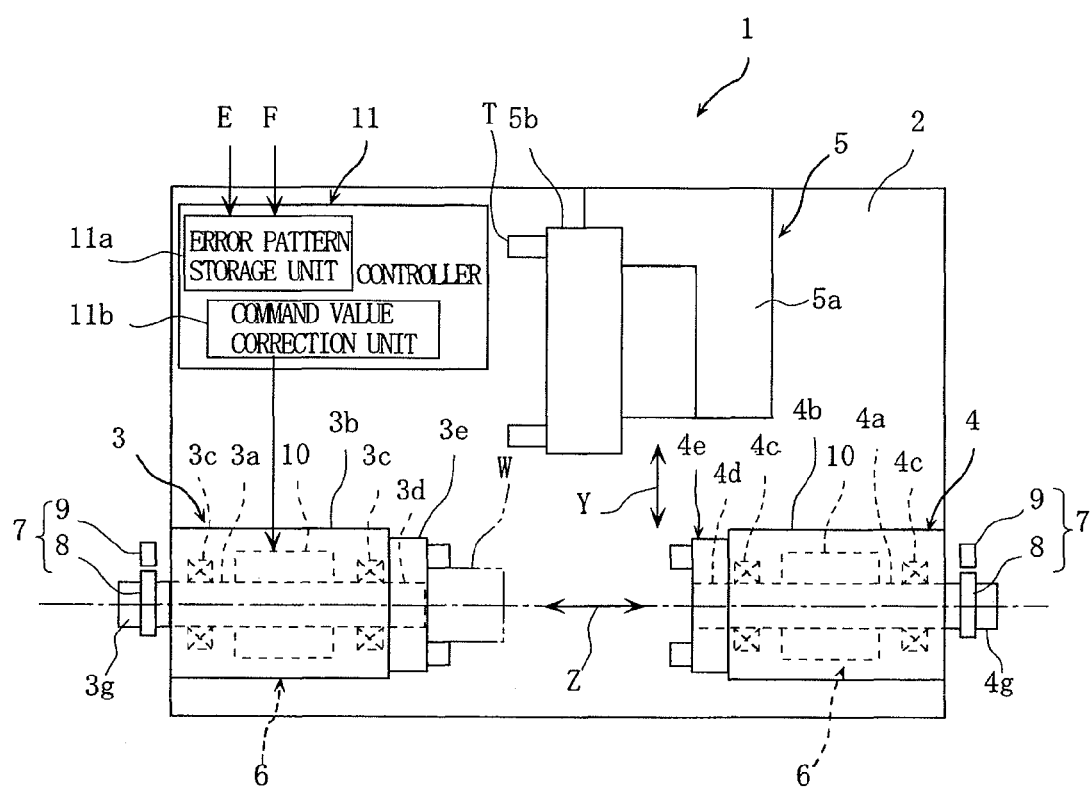
FIG. 1 is a schematic plane view of a machine tool including a rotation angle positioning device according to an embodiment 1 of the present invention.

Embodiments of the present invention will be hereinafter described based on the attached drawings.
[Embodiment 1]
FIG. 1 to FIG. 10 are drawings used to describe a rotation angle positioning device of a machine tool according to an embodiment 1 of the present invention.

In the drawings, 1 denotes a turret lathe as an example of the machine tool. The turret lathe 1 includes a first headstock 3 disposed on a left end portion of a bed 2, a second headstock 4 disposed to face the first headstock 3, and a tool post 5 disposed between and on a rear side of the first and second headstocks 3, 4.

The second headstock 4 is disposed so as to be movable in an axial direction (Z-axis direction), with an axis of its second spindle 4a being coaxial with an axis of a first spindle 3a of the first headstock 3. The tool post 5 has a tool post base 5a disposed to be movable in a Y-axis direction perpendicular to the Z axis and a turret 5b disposed on the tool post base 5a so as to be rotatable around a rotation axis parallel to the Z axis, and a plurality of tools T are installed on the turret 5b.

The first headstock 3 has a first headstock housing 3b fixed on the bed 2 and the first spindle (rotating shaft) 3a rotatably supported by the first headstock housing 3b via a plurality of bearings 3c. Further, a chuck 3e holding an object to be machined (workpiece) W is attached to a tip portion 3d of the first spindle 3a projecting from the first headstock housing 3b toward the second headstock 4.

The second headstock 4 has a second headstock housing 4b mounted on the bed 2 to be movable in the Z-axis direction and the second spindle (rotating shaft) 4a rotatably supported by the second headstock housing 4b via a plurality of bearings 4c. Further, a chuck 4e holding the object to be machined (workpiece) is attached to a tip portion 4d of the second spindle 4a projecting from the second headstock housing 4b toward the first headstock 3.

The first headstock 3 and the second headstock 4 include rotation angle positioning devices 6 having the same structure. Hereinafter, the rotation angle positioning device 6 provided on the first headstock 3 will be described.

The rotation angle positioning device 6 includes: a rotation angle detection device 7 detecting a rotation angle of the first spindle 3a; a driving motor 10 rotating the first spindle 3a so that the rotation angle detected by the rotation angle detection device 7 becomes a given command value α for rotation angle; and a controller 11 controlling the driving by the driving motor 10.

The controller 11 includes: an error pattern storage unit 11a storing a rotation period error pattern E and a tooth-to-tooth period error pattern F, which will be described later; and a command value correction unit 11b correcting the command value α for rotation angle based on the rotation period error pattern E to find a first corrected command value α1 for rotation angle and correcting the first corrected command value α1 for rotation angle based on the tooth-to-tooth period error pattern F to find a second corrected command value α2 for rotation angle.

The driving motor 10 is disposed between the first headstock housing 3b and the first spindle 3a and has a function of rotationally driving the first spindle 3a at a high speed and a function of rotationally driving the first spindle 3a by a minute angle.

The rotation angle detection device 7 includes: a detection target ring 8 fixed to a rear end portion 3g of the first spindle 3a to rotate with the first spindle 3a; and an angle detection sensor 9 fixedly disposed so as to face the detection target ring 8 in a noncontact state.

The detection target ring 8 is made of a soft magnetic material in an annular shape, with a plurality of (512 in this embodiment) teeth 8a formed at a predetermined pitch on its outer circumferential surface.

The angle detection sensor 9 has: a permanent magnet 9b disposed and fixed in a case 9a made of a nonmagnetic material so as to face tip surfaces 8b of the teeth 8a at a right angle; and a Hall IC 9c disposed and fixed in the case 9a so as to be located between the permanent magnet 9b and the tip surfaces 8b and having a plurality of Hall elements 9d. The permanent magnet 9b is disposed so that its NS polar axis makes a right angle to the tip surfaces 8b, and the Hall IC 9c is disposed on the N-pole side.

Figure 2:
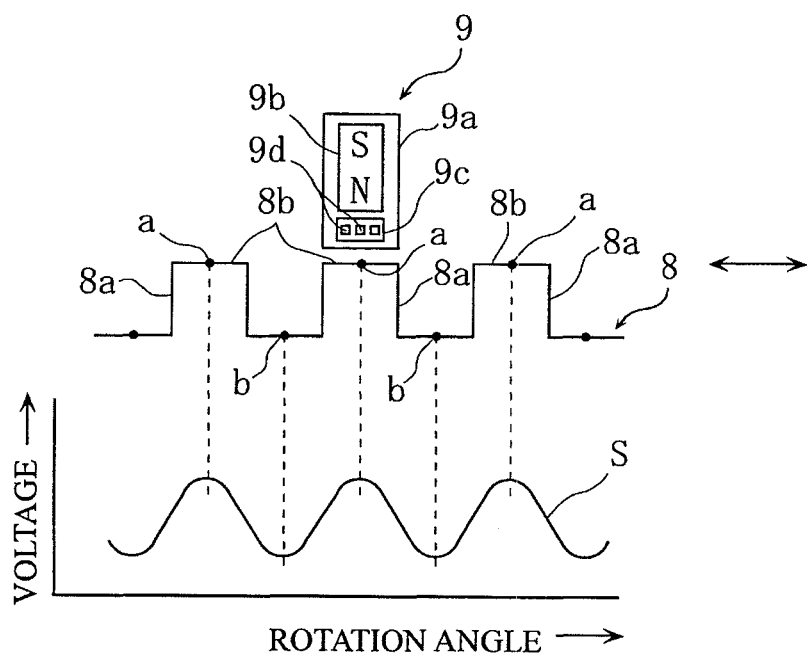
FIG. 2 is a schematic diagram of a rotation angle detection device part of the rotation angle positioning device according to the embodiment 1 of the present invention.

The rotation angle detection device 7 of this embodiment detects the rotation angle of the first spindle 3a by the detection target ring 8 and the angle detection sensor 9. Concretely, as shown in FIG. 2, the angle detection sensor 9 outputs a voltage signal S according to its distance to a facing surface of the detection target ring 8. The magnitude of the voltage signal S is highest when the angle detection sensor 9 faces a rotation-direction center portion a of the tip surface 8b of the tooth 8a, and its value gradually decreases as the position the angle detection sensor 9 faces goes from here toward a center portion b between the teeth 8a, 8a, and gradually increases as the position the angle detection sensor 9 faces further goes toward an adjacent tip surface 8b. Therefore, the rotation angle of the first spindle 3a is detected based on the magnitude of the voltage signal S from the angle detection sensor 9.

The first spindle 3a is rotationally driven by the driving motor 10 to be positioned so that the rotation angle detected by the rotation angle detection device 7 becomes a given command value α for rotation angle.

Figure 3:
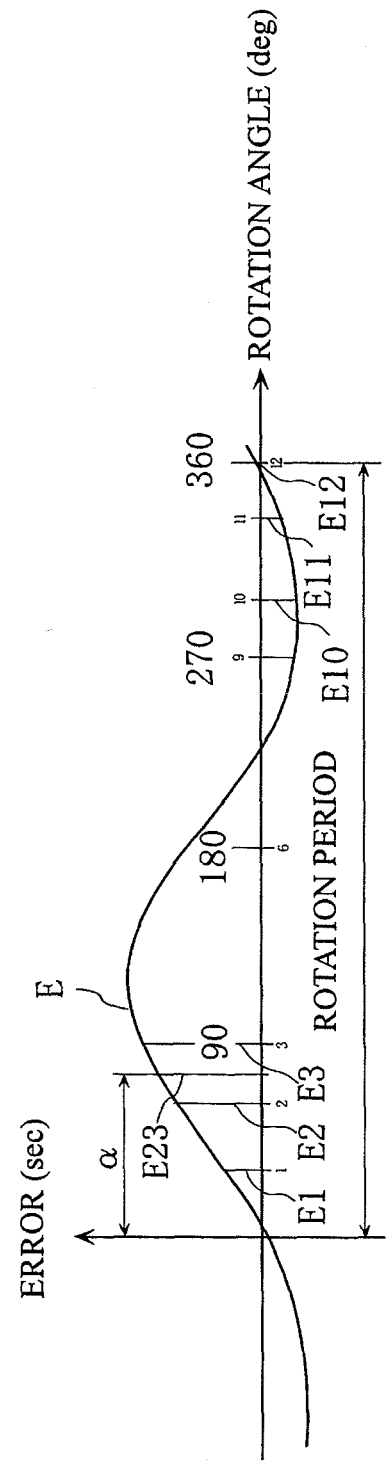
FIG. 3 is a schematic chart of a rotation period error pattern of the rotation angle positioning device according to the embodiment 1 of the present invention.
Figure 4:
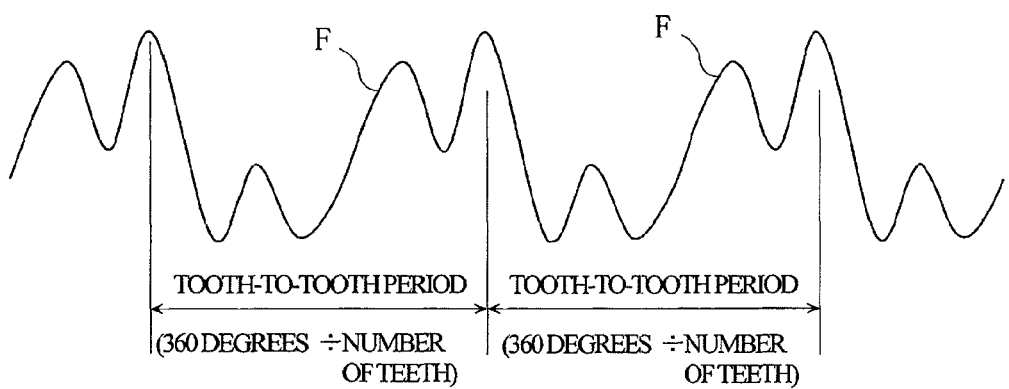
FIG. 4 is a schematic chart of a tooth-to-tooth period error pattern of the rotation angle positioning device according to the embodiment 1 of the present invention.

In the rotation angle detection device 7, rotation period errors shown in FIG. 3 sometimes occur due to the deviation of a center position of the detection target ring 8 or the like while the detection target ring 8 rotates once, and tooth-to-tooth period errors shown in FIG. 4 sometimes occur in each tooth-to-tooth period due to machining accuracy of the teeth 8a of the detection target ring 8 or the like.

Therefore, in this embodiment, the command value α for rotation angle is corrected based on the rotation period error pattern E, whereby a first corrected command value α1 for rotation angle is found, as will be detailed later. Subsequently, the first corrected command value α1 for rotation angle is corrected based on the tooth-to-tooth period error pattern F, whereby a second corrected command value α2 for rotation angle is found.

Then, the driving motor 10 rotationally drives the first spindle 3a so that the rotation angle detected by the rotation angle detection device 7 matches the second corrected command value α2 for rotation angle, whereby the rotation angle positioning of the first spindle 3a is performed.

The rotation period error pattern E is found in the following way. First, as shown in FIG. 3, correction dividing points 1 to 12 equally dividing a rotation period (360°) of the detection target ring 8 into twelve 30° segments, for instance, are found. As for the rotation angles corresponding to the respective correction dividing points 1 to 12, differences between detected rotation angles measured by using the actually adopted angle detection sensor 9 and reference rotation angles measured by using a high-accuracy sensor having sufficiently high resolution are found. Then, the differences at the correction dividing points 1 to 12 are defined as rotation period errors E1, E2, ... E12, and a curve connecting the rotation period errors E1 ... E12 is defined as the rotation period error pattern E.

Figure 5:
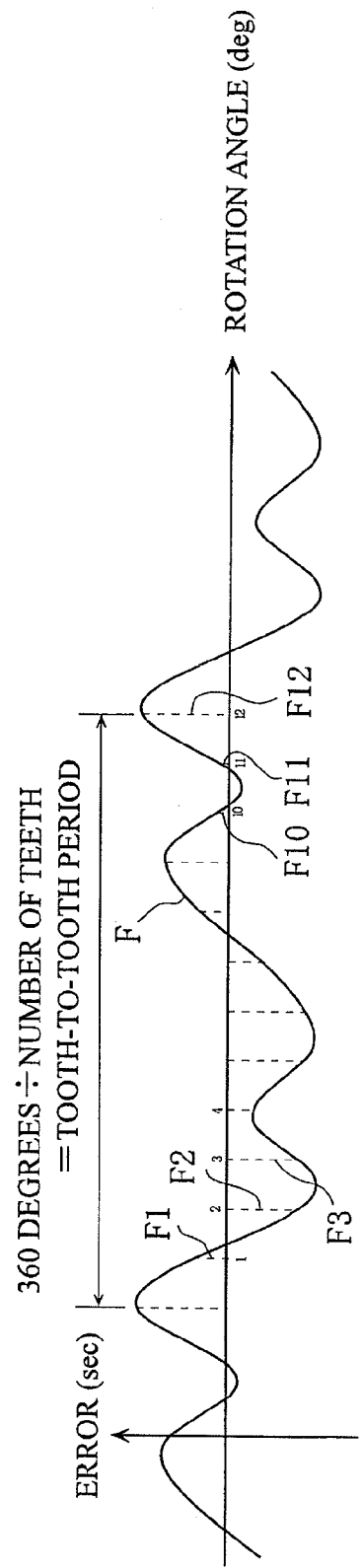
FIG. 5 is a schematic chart used to describe how to find the tooth-to-tooth period error pattern.
Figure 6:
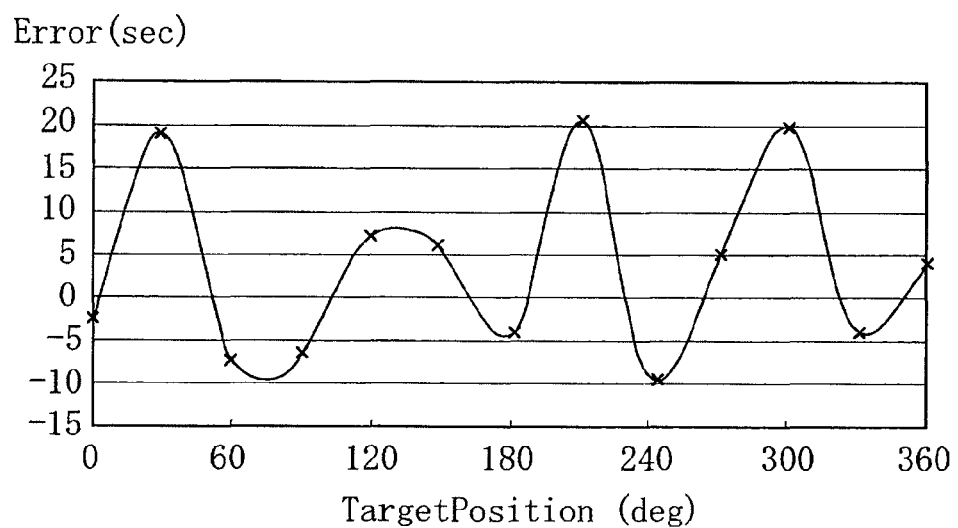
FIG. 6 is a schematic chart of a concrete example of the rotation period error pattern.
Figure 9:
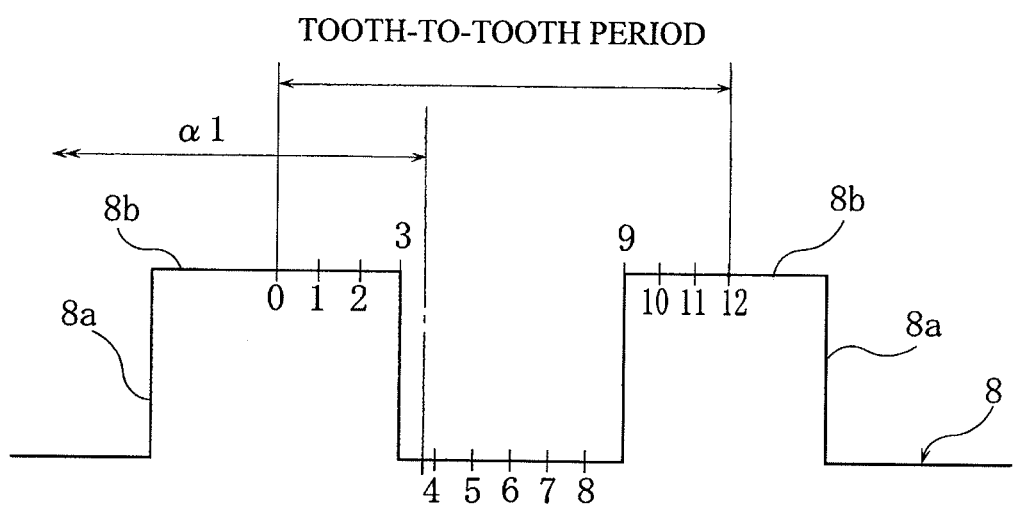
FIG. 9 is a schematic chart used to describe a tooth-to-tooth period adopted in the flowchart.

The tooth-to-tooth period error pattern F is found in the following way. First, when the number of correction division in a tooth-to-tooth period is 12 as shown in FIG. 5 and FIG. 9, correction dividing points 1 to 12 equally dividing an interval between arbitrary teeth 8a to 8a into 12 segments are found. As for rotation angles corresponding to the respective correction dividing points 1 to 12, errors between detected rotation angles measured by using the actually adopted angle detection sensor 9 and reference rotation angles measured by using the high-accuracy sensor having sufficiently high resolution are found. Then, the differences at the respective correction dividing points 1 to 12 are defined as tooth-to-tooth period errors F1, F2, ... F12, and a curve connecting the tooth-to-tooth period errors F1 ... F12 is defined as the tooth-to-tooth period error pattern F.

Figure 7:
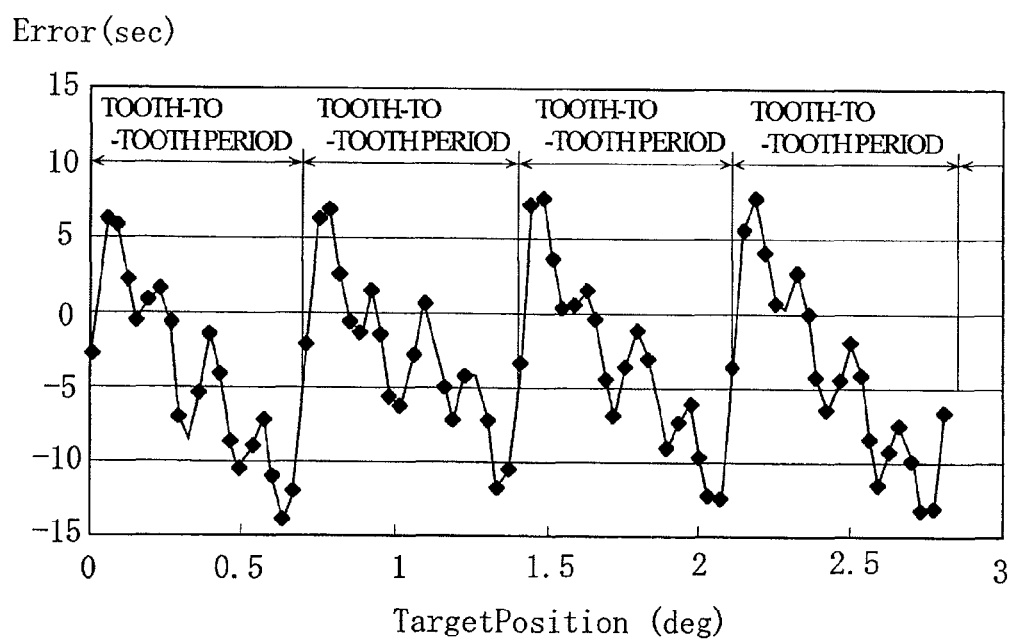
FIG. 7 is a schematic chart of a concrete example of the tooth-to-tooth period error pattern.

Here, it has turned out that the tooth-to-tooth period error pattern F presents substantially the same tendency in any tooth-to-tooth period as shown in FIG. 4 or FIG. 7, for instance. Therefore, in this embodiment, the tooth-to-tooth period error pattern F in an arbitrary tooth-to-tooth period is found, and this pattern F is employed in all the tooth-to-tooth periods. Therefore, the number of the correction dividing points for the measurement can only be 12 regardless of the number of the teeth of the detection target ring 8 and can be greatly reduced. Incidentally, if the errors are found by the same method as the method of finding the rotation period error pattern E, the number of correction dividing points=512×12=6144.

The rotation period error pattern E and the tooth-to-tooth period error pattern F are stored in the error pattern storage unit 11a of the controller 11. The command value correction unit 11b corrects the command value α for rotation angle based on the rotation period error pattern E to find the first corrected command value α1 for rotation angle, and further corrects the first corrected command value α1 for rotation angle based on the tooth-to-tooth period error pattern F to find the second corrected command value α2 for rotation angle.

A method of finding the first corrected command value α1 for rotation angle when the command value for rotation angle is α will be described along with FIG. 3.

α1 is found as follows, where E23 is a correction value corresponding to the command value α for rotation angle on the rotation period error pattern E.

$$\alpha1 = \alpha + E23$$

$$E23 = E2 + (E3 - E2) \times (\alpha - 60°)/30°$$

Figure 8:
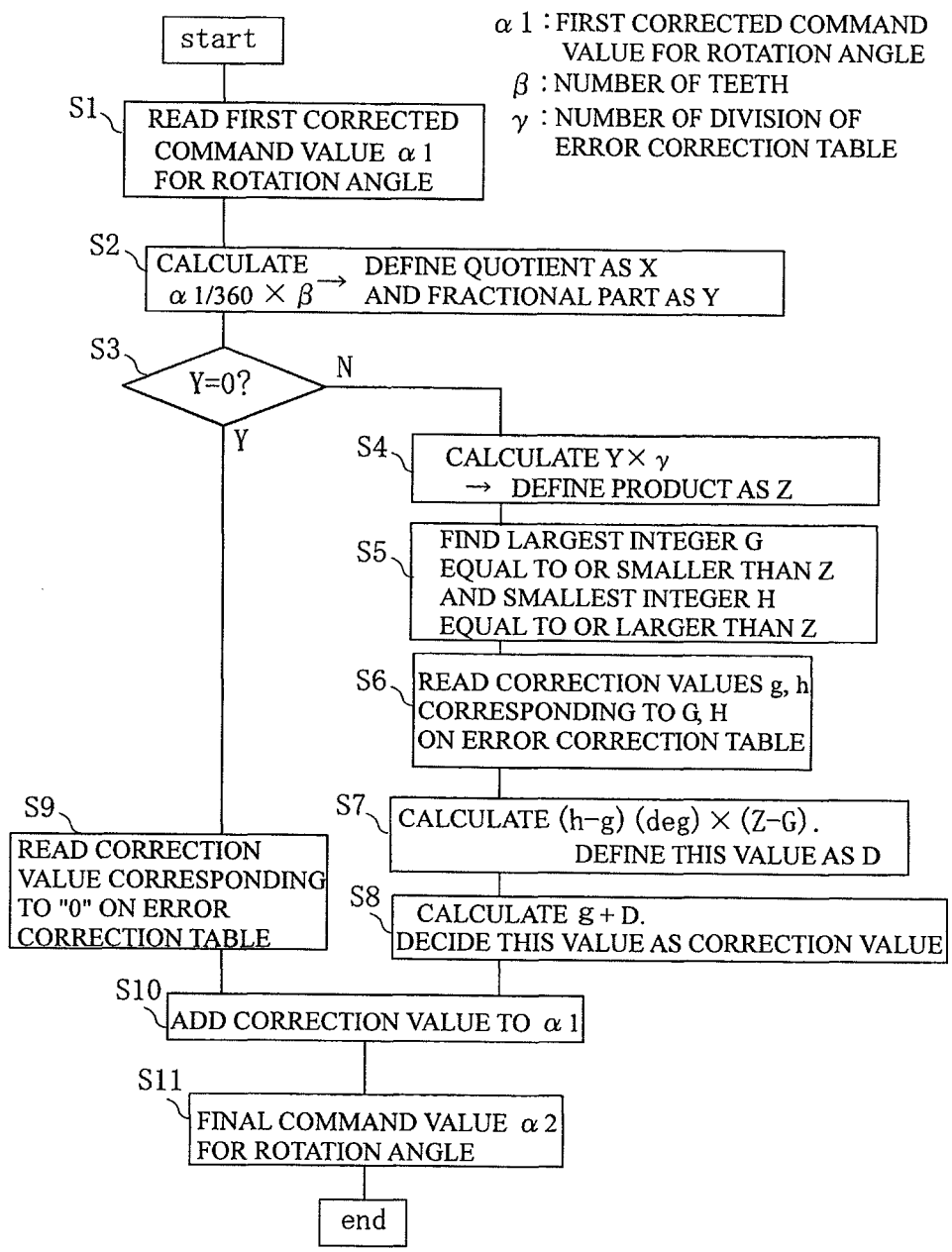
FIG. 8 is a flowchart used to describe the operation of the rotation angle positioning device according to the embodiment 1 of the present invention.

Next, a method of finding the second corrected command value α2 for rotation angle will be more concretely described based on the flowchart in FIG. 8. In this case, the command value for rotation angle: α, the first corrected command value for rotation angle: α1, the second corrected command value for rotation angle: α2, the number of teeth of the detection target ring 8: β (=512), and the number of division in an error correction table (the number of correction dividing points): γ (=12).

First, the first corrected command value α1 for rotation angle which is the command value α for rotation angle corrected by the aforesaid method is read (Step S1), and how many teeth 8a of the detection target ring 8 the first corrected command value α1 for rotation angle is equivalent to is calculated by (α1/360°)×β (Expression 1). In this case, the quotient (the integral part) of the expression 1 is defined as X and the fractional part thereof is defined as Y (Step 2).

When the fractional part (Y) is 0 (Step S3), that is, when the first corrected command value α1 for rotation angle is an angle coinciding with the center portion a of the tip surface 8b of any of the teeth 8a of the detection target ring 8, a correction value corresponding to the dividing point "0" in the error correction table shown in FIG. 10 is read (Step S9), this correction value is added to the first corrected command value α1 for rotation angle (Step S10), and the addition result is defined as the final command value for rotation angle (the second corrected command value α2 for rotation angle) (Step S11).

On the other hand, when the Y is not 0 at Step S3, that is, when the first corrected command value α1 for rotation angle is an angle corresponding to a point between any adjacent teeth 8a, 8a, the adjacent correction dividing points between which the first corrected command value α1 for rotation angle is located are first found, and the correction value is calculated from the error correction table based on this position. Incidentally, when the first corrected command value α1 for rotation angle coincides with any of the correction dividing points, the correction value corresponding to this dividing point is added as it is to the first corrected command value α1 for rotation angle.

Concretely, the fractional part (Y)×the number of division (γ) (Expression 2) is calculated and its product is defined as Z (Step S4), and the largest integer G equal to or smaller than the product Z and the smallest integer H equal to or larger than the product Z are found (Step S5).

Correction values g, h corresponding to the integers G, H on the error correction table are read (Step S6), subsequently (h−g)×(Z−G) is calculated, its product is defined as D (Step S7), and the sum of (g+D) is decided as the correction value (Step S8).

Then, the sum of the above correction value and the first corrected command value α1 for rotation angle becomes the final command value for rotation angle (the second corrected command value α2 for rotation angle) (Steps S10, S11).

More concretely, when it is found at Step S2 that the first corrected command value α1 for rotation angle is equivalent to, for example, 99.32 pieces of the teeth of the detection target ring 8, the result at Step S4 is Y×γ=0.32×12=3.84, and the result at Step S5 is such that the largest integer G equal to or smaller than 3.84 is 3 and the smallest integer H equal to or larger than 3.84 is 4, and at Step S6, g=the correction value corresponding to the dividing point 3=−0.003 (deg) and h=the correction value corresponding to the dividing point 4=0.005 (deg) are read from the error correction table in FIG. 10. Subsequently, the result at Step S7 is (h−g)×(Z−G)=(0.005−(−0.003))×(3.84−3)=0.00672=D, at Step S8, g+D=−0.003+0.00672=0.00372 (deg) is decided as the correction value, and the first corrected command value α1 for rotation angle+0.00372 (deg) is decided as the final command value for rotation angle (the second corrected command value α2 for rotation angle).

As described above, in this embodiment, the command value α for rotation angle is corrected based on the rotation period error pattern E, whereby the first corrected command value α1 for rotation angle is found, and the first corrected command value α1 for rotation angle is corrected based on the tooth-to-tooth period error pattern F, whereby the second corrected command value α2 for rotation angle is found, which makes it possible to surely correct an error ascribable to the deviation of the center of the detection target ring 8 or the like and an error ascribable to machining accuracy of the teeth 8a of the detection target ring 8 or the like.

Further, the tooth-to-tooth period error pattern F changes due to individual differences of the detection target ring and the angle detection sensor, but it has been found out that with the same detection ring, the same angle detection sensor, and the same installation condition, substantially the same tendency is presented in any tooth-to-tooth period, and with this point noted, the error correction table shown in FIG. 10 is created based on the tooth-to-tooth period error pattern F in an arbitrary tooth-to-tooth period, and this table is used for the correction in all the tooth-to-tooth periods. Therefore, it is possible to greatly reduce the number of the correction dividing points and only a small memory capacity is required.

Further, the command value α for rotation angle is corrected based on the rotation period error pattern E, whereby the first corrected command value α1 for rotation angle is found, and the first corrected command value α1 for rotation angle is corrected based on the tooth-to-tooth period error pattern F, whereby the second corrected command value α2 for rotation angle is found. Therefore, the correction of an error ascribable to the deviation of the center of the detection target ring or the like is followed by the correction of an error ascribable to machining accuracy of the teeth of the detection target ring or the like, which makes it possible to more efficiently and surely correct the both errors.

[Embodiment 2]

FIG. 11 to FIG. 14 are drawings used to describe an embodiment 2 of the present invention. In the embodiment 2, the correction of the command value α for rotation angle for finding the first and second corrected command values α1, α2 for rotation angle is made under the following condition.

Figure 12:
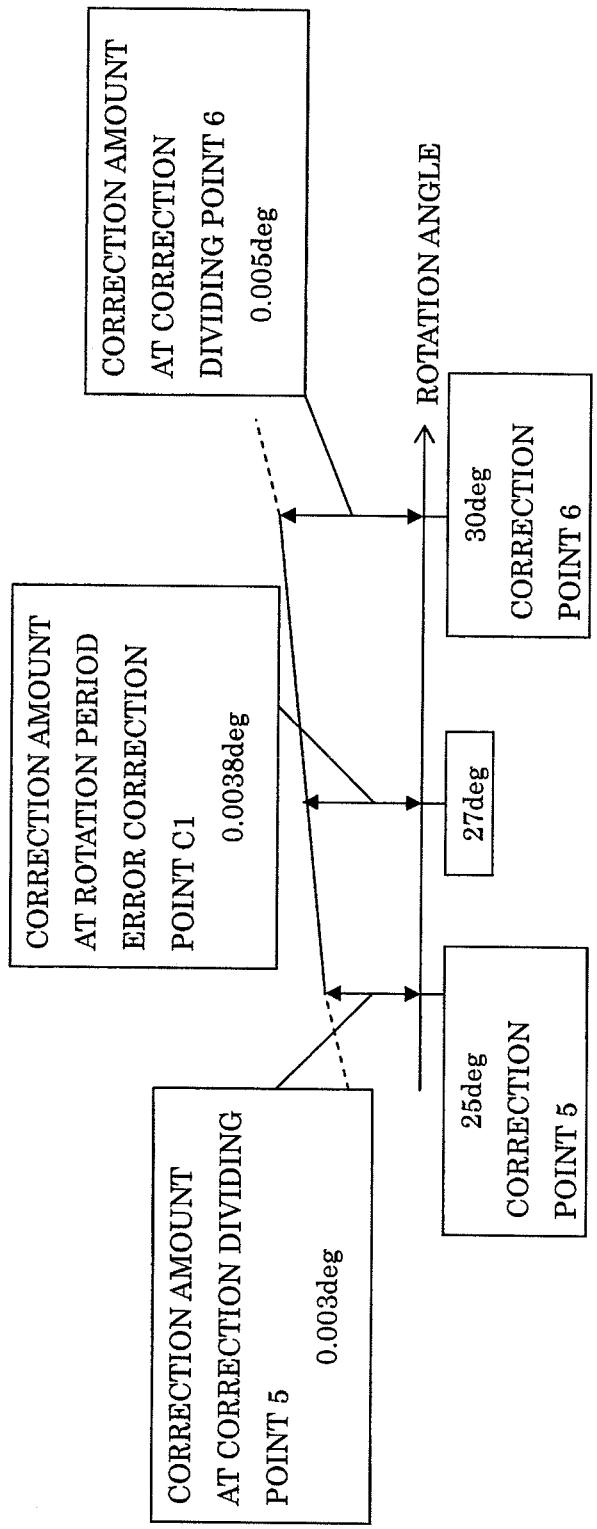
FIG. 12 is a chart used to describe a method of finding a rotation period error of the rotation angle positioning device according to the embodiment 2 of the present invention.

The command value α for rotation angle=27 deg, an interval B between correction dividing points in a rotation period=5 deg, and a rotation period error correction table (rotation period error pattern E) shown in FIG. 11 is prepared. The number of teeth of the detection target ring=512, the number of correction dividing points γ in a tooth-to-tooth period=16, and a tooth-to-tooth period error correction table (tooth-to-tooth period error pattern F) shown in FIG. 12 is prepared. Incidentally, the command value α for rotation angle is decided in consideration of necessary corrections such as backlash correction, thermal displacement correction, and the like.

(1) The command value α for rotation angle=27 deg is read.

(2) First, a rotation period error is calculated. A rotation period error correction point C1=α/B=27/5=5.4 is found, the target correction point C1 is located between a correction dividing point 5 and a correction dividing point 6, and a correction ratio D at the correction point C1 is D=0.04.

(3) A correction amount Ec1 at the rotation error correction point C1 is calculated as follows by using correction amounts E5, E6 at the correction dividing points 5, 6 on the rotation period error correction table (refer to FIG. 12).

$$Ec1 = E5 + (E6 - E5) \times D$$

As is seen from the rotation period error correction table shown in FIG. 11, E5=0.003 deg and E6=0.005 deg, and therefore, $$Ec1 = 0.003 + 0.002 \times 0.4 = 0.0038$$

(4) Therefore, the first corrected command value α1 for rotation angle=α+Ec1=27.0038 deg.

(5) Subsequently, the tooth-to-tooth period error is calculated. A tooth-to-tooth period error correction point C2=α1/(360/the number of teeth)=27.0038/(360/512)=38.4054044..., and therefore, the tooth-to-tooth period error correction point C2 is located between the 38th and 39th teeth of the detection target ring.

(6) Further, the number of division 16×0.405... = 6.4864..., and therefore, the correction point C2 is located between the correction dividing point 6 and the correction dividing point 7 and a tooth-to-tooth correction division ratio N=0.4864...

Figure 14:
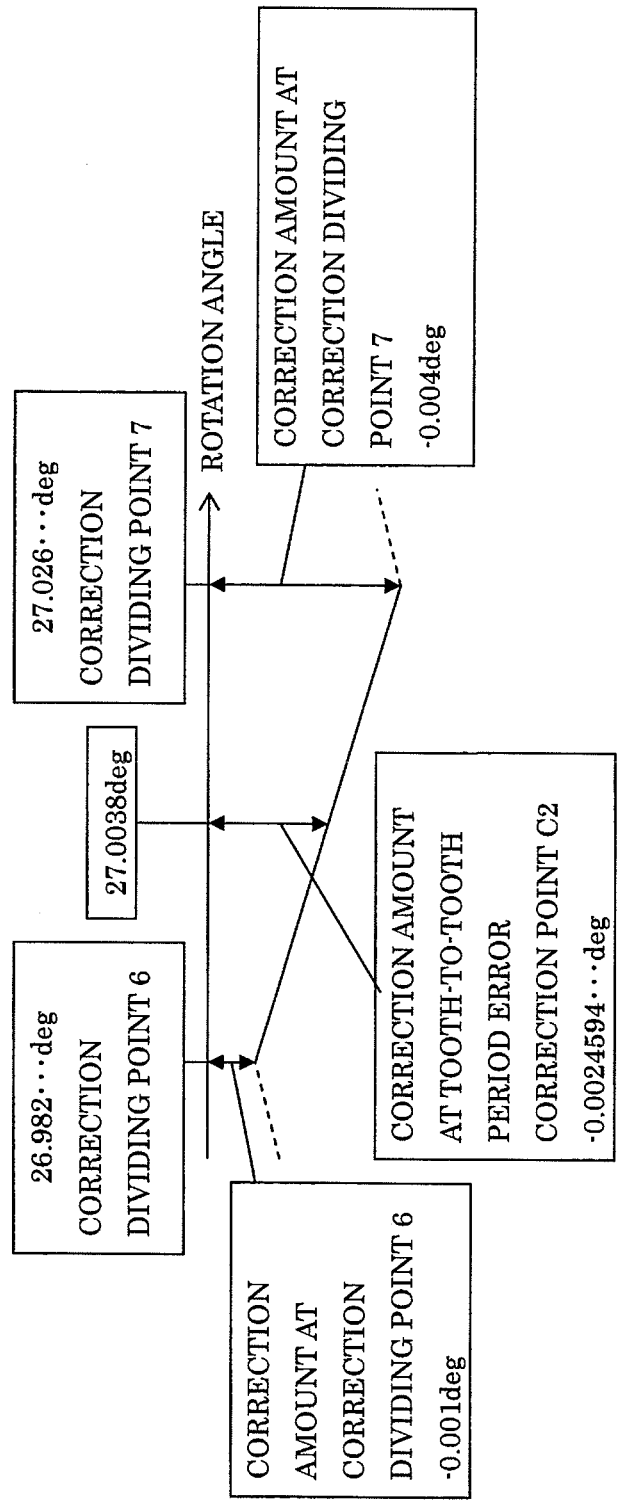
FIG. 14 is a chart used to describe a method of finding a tooth-to-tooth period error of the rotation angle positioning device according to the embodiment 2 of the present invention.

(7) A correction amount Fc2 at the tooth-to-tooth period correction point C2 is calculated as follows by using correction amounts F6, F7 at the correction dividing points 6, 7 on the tooth-to-tooth period error correction table (refer to FIG. 14).

$$Fc2 = F6 + (F7 - F6) \times N$$

F6=−0.001 deg and F7=−0.004 deg as is seen from the tooth-to-tooth period error correction table shown in FIG. 13, and therefore, $$Fc2 = -0.001 + (-0.004 + 0.001) \times 0.4864\ldots = -0.0024594\ldots$$

(8) Therefore, the second corrected command value α2 for rotation angle=α1+Fc2=27.0038−0.0024594 . . =27.0013405 . . deg.

In the embodiment 2, the same effects as those of the embodiment 1 are also obtained.

The invention may be embodied in other specific forms without departing from the spirit or essential characteristics thereof.

The present embodiments are therefore to be considered in all respects as illustrative and no restrictive, the scope of the invention being indicated by the appended claims rather than by the foregoing description, and all changes which come within the meaning and range of equivalency of the claims are therefore intended to be embraced therein.

What is claimed is:

1. A rotation angle positioning device including:
a rotation angle detection device which has a detection target ring provided on a rotating shaft and having a plurality of teeth formed at a predetermined pitch and an angle detection sensor disposed to face the teeth and generating an output according to a distance to the teeth and which finds a rotation angle of the detection target ring based on the output from the angle detection sensor; and
a rotating-shaft driving device rotating the rotating shaft so as to cause the rotation angle to become a given command value for rotation angle,
the rotation angle positioning device comprising:
an error pattern storage unit storing a tooth-to-tooth period error pattern made up of errors between detected rotation angles by the angle detection sensor and actual rotation angles, corresponding to respective correction dividing points of an arbitrary tooth-to-tooth period in the detection target ring; and
a command value correction unit correcting the command value for rotation angle based on the tooth-to-tooth period error pattern to find a corrected command value for rotation angle.

2. The rotation angle positioning device according to claim 1, wherein:
the error pattern storage unit stores the tooth-to-tooth period error pattern and a rotation period error pattern made up of errors between detected rotation angles by the angle detection sensor and actual rotation angles when the detection target ring is rotated once; and
the command value correction unit corrects the command value for rotation angle based on the rotation period error pattern and the tooth-to-tooth period error pattern to find the corrected command value for rotation angle.

3. The rotation angle positioning device according to claim 2, wherein
the command value correction unit corrects the command value for rotation angle based on the rotation period error pattern to find a first corrected command value for rotation angle, and corrects the first corrected command value for rotation angle based on the tooth-to-tooth period error pattern to find a second corrected command value for rotation angle.

* * * * *